Aug. 10, 1937.   A. NEWMAN   2,089,406
METHOD OF MAKING BORIC ACID
Filed Aug. 13, 1928
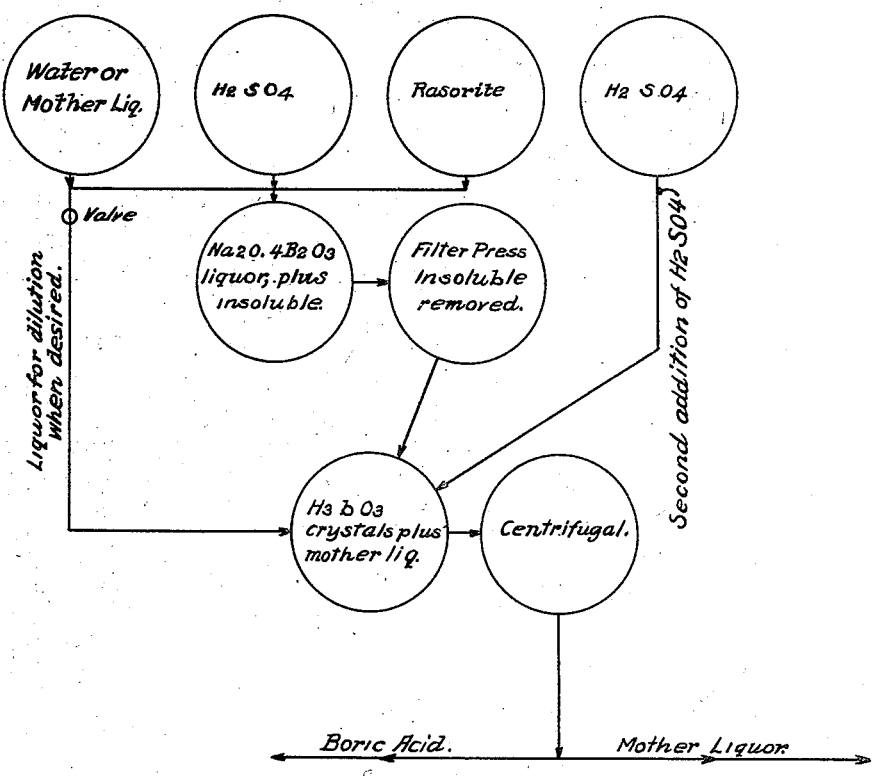
Inventor:
Alfred Newman:
By Riordan & Riordan
Attys:

Patented Aug. 10, 1937

2,089,406

UNITED STATES PATENT OFFICE 2,089,406

METHOD OF MAKING BORIC ACID

Alfred Newman, Tompkinsville, N. Y., assignor to Pacific Coast Borax Company, New York, N. Y., a corporation of Nevada Application August 13, 1928, Serial No. 299,452

8 Claims. (Cl. 23—149)

This invention relates to methods of making boric acid and particularly to such methods for the recovery of boric acid from particular types of borate minerals.

Among the objects of the present invention are the production of boric acid from solutions much more concentrated in respect to boric oxide ($B_2O_3$) than was possible in prior art processes.

A further object of the invention is the production of solutions containing such increased concentrations of sodium borates which do not readily crystallize from such solutions thus permitting filtration and storage of such liquors without the necessity of keeping them hot to avoid crystallization.

Another object of the invention is the production of such solutions or mother liquors from which boric acid ($H_3BO_3$) is to be produced, which mother liquors are approximately neutral.

A still further object of the invention is to obtain a maximum yield of boric acid from a unit volume of liquor of the character set forth above and to allow for a minimum quantity of liquor removed from the process with consequent minimum loss of boric acid.

A still further object of the invention is to produce boric acid of any desired quality, from solutions of various concentrations of sodium sulphate, it being understood that larger or smaller quantities of sodium sulphate present affect the quality of the boric acid produced.

Still further objects and advantages will appear from the more detailed description set forth below, it being understood, however, that this more detailed description is given by way of explanation only and not by way of limitation, since various changes may be made in this more detailed description by those skilled in the art without departing from the scope and spirit of this invention.

The accompanying drawing is to a flow sheet diagrammatically illustrative of this invention.

The present invention is primarily concerned with the recovery of boric acid from a newly discovered sodium borate having the formula

This newly discovered sodium borate is differentiated in certain physical or chemical characteristics from all other borates. The crystalline form is new among sodium borates; as is also its property of dissolving slowly in water. The borate is found naturally occurring mixed with volcanic earths and other undesirable materials. It is called rasorite. This new sodium borate may also be referred to as kernite, and is found in Kern County, California.

Boric acid has hitherto been made from natural borates by setting free in solution boric acid which is then crystallized by cooling the solutions so obtained. All such methods as now practiced have the great disadvantage that under the actual working conditions it is not practicable to work with high concentrations of boron oxide.

I have invented a method of working rasorite or any sodium borate such as borax, by which very great concentrations of boron oxide are obtained. Operating as I do I find it feasible to produce concentrations of boron oxide in liquor as high as 20% of the weight of such liquor. In the art as previously practiced it has not been found possible to work with liquors containing the high concentrations which I employ.

The present invention consists in taking rasorite and adding thereto water and sulphuric acid, employing suitable agitation and heat if desired. The sulphuric acid is added in sufficient quantity to combine with one-half of the sodium oxide present, forming sodium sulphate and sodium octoborate, according to the chemical reaction:—

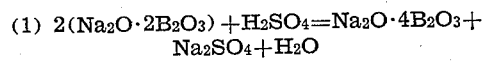

It is well known that the solubility of sodium octoborate in water is very great, and I find that it is an easy matter to produce solutions according to the above reaction containing 20% boron oxide. This reaction is given by way of illustration only and not by way of limitation. Sodium decaborate ($Na_2O \cdot 5B_2O_3$) which is greatly soluble in water may be produced, or any other suitable proportion of $Na_2O$ and $B_2O_3$.

Having produced such solutions, they are then passed through a suitable filter press, thus removing any undesirable solid matter present, and producing clarified solutions.

To the filtered solution is added sulphuric acid to combine with the remaining sodium oxide present in the solution, according to the reaction:

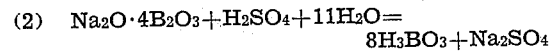

Upon adding sulphuric acid to sodium octoborate, boric acid is set free and crystallizes. The solution may then be cooled, if desired, by any suitable means.

As illustrated in the equations above, and for convenience taking the atomic weight of boron as 11, four molecules of boron oxide ($B_2O_3$) produce 2 molecules of sodium sulphate and eight molecules of boric acid ($H_3BO_3$) or stated quantitatively, 280 parts of boron oxide produce 284 parts of sodium sulphate and 496 parts of boric acid. The principal impurity remaining in the solution from the treatment of rasorite in accordance with this invention is sodium sulphate which is very soluble in water, and it has also been found that its solubility in the mother liquors being treated in accordance with the present invention is approximately the same as the solubility in water. The process is, therefore, so carried out and materials are treated in such quantities that the liquor at its minimum temperature will be nearly saturated with respect to sodium sulphate. This will, of course, prevent any sodium sulphate from crystallizing out with the boric acid so that a good grade of commercial or U. S. P. or any other quality, boric acid is obtainable.

The solubility of sodium sulphate in the liquors is greater at lower temperatures than at higher, and the temperatures to which it is found most convenient and practicable to cool the liquor in large scale commercial production correspond approximately to the temperatures of larger solubility of sodium sulphate in the liquors, said temperatures being 32 to 35° C. Thus my process takes advantage of the increased solubility of sodium sulphate in the liquor at lower temperatures.

In accordance with the present invention, it is impracticable to utilize the spent mother liquors over and over again, unless these liquors are purified by the removal of sodium sulphate from them. Since in general the spent mother liquors are used but once in the present process, it is evident that one must begin with a liquor of the highest possible concentration of boron oxide and end with a liquor of the lowest practicable concentration. The high concentration of boron oxide is obtained in the liquor in the manner set forth above, the limit of the amounts of boron oxide in solution being fixed by the maximum quantity of sodium sulphate which the liquor will carry in solution at its minimum temperature at any particular stage of the process.

By the manner set forth above, a maximum recovery of boric acid from rasorite is obtained effecting economies in regard to the various elements, such as heating, power, labor, etc., which enter into ordinary boric acid manufacture. For economical operation as explained above the quantity of mother liquor removed from the process must be as small in weight as possible. Using concentrated solutions in accordance with the present invention, the volume of liquor processed is much less than when using the less concentrated solutions of the prior art. Such concentrated liquors are obtained by the method of decomposition set forth above at the same time that maximum yield of boric acid per unit of volume of liquor treated is secured.

By the methods above described, it is intended to produce boric acid of any quality desired. Thus may be produced boric acids containing 99.5 to 100%, or 99, 98, 97, 95 or any other possible percentage of boric acid ($H_3BO_3$).

Usually it is preferable to produce boric acid of a commercial quality equal to or better than present commercial grades, but I do not confine the invention to such quality.

By the method above described, there is used a much smaller volume of liquor for the production of a constant quality of boric acid. For example, a liquor containing 27.62% of boric acid ($H_3BO_3$) may be taken and cooled until the supernatent liquor contains in solution 7% of boric acid ($H_3BO_3$). Thus from 100 parts of liquor is obtained 22.17 parts of boric acid.

It has been customary to crystallize acid from solutions containing 16-17% boric acid, and to cool such solutions until they contained 6-7% boric acid. When a 17% liquor is cooled to the point where the liquor contains 7% boric acid in solution, 10.75 parts of boric acid are obtained from 100 parts of liquor. Thus by the present process is obtained over twice as much acid from a given volume of liquor as hitherto obtained.

Some of the improvements and consequent economies effected by the present process are as follows:—

(1) Since the volume of liquor handled to produce a given quantity of boric acid is less than one-half that now used, the cost of plant, such as land, building, apparatus, etc., for a given quantity of acid to be produced is much less.

(2) Less apparatus being used, there is a substantial saving in repair cost.

(3) Less apparatus being used, less power is required.

(4) Less heat is required, since the volume or weight of liquor heated is less.

(5) The octoborate liquors produced are approximately neutral, thus effecting great saving in wear and tear of plant and initial cost of apparatus handling such liquor, permitting the use of wooden apparatus or steel instead of acid resistant metal such as lead, brass, bronze, etc., as in the prior art.

The spent liquors from the process set forth above may be treated for the recovery of sodium sulphate therefrom.

Liquor resulting from reaction (2) shown above may be mixed with a suitable quantity of spent mother liquor recovered during the process and containing about 7% of boric acid to reduce the boric acid in the liquor used for crystallization to about 17% concentration which is desirable for the production of large-sized crystals of boric acid.

Since such admixture is subsequent to the operation for the formation of the octoborate liquor and the liberation of boric acid therefrom, the spent mother liquor does not pass through the process as a whole, but is simply mixed with the acid to liberate the boric acid in it. As an example of this method of procedure the following is given:—

To a proper weight of the strong octoborate liquor there is added the requisite amount of sulphuric acid to liberate boric acid in quantity equivalent to 27.62% of the weight of the resulting liquor. To 100 pounds of this, there is then added 110 parts of the weak liquor containing 7 parts of boric acid per 100 parts of such liquor. The two liquors when mixed produce 220 parts of liquid containing 35.32 parts of boric acid, or 16.82% of boric acid. From the latter liquor boric acid may be recovered by cooling but it will be noted that the use of 7% mother liquor in no way affects the weight of boric acid recovered from 100 parts of the strong liquor used.

If desired the weak liquor may be added to the strong liquor before the addition of sulphuric acid.

It is thus seen that the present process enables the recovery of relatively large quantities of boric acid from given solutions or mother liquor and allows of the utilization of higher concentrations of boron oxide in such solutions in order to produce economy of operation.

In illustrating the process, sulphuric acid has been referred to as a suitable acid, but any suitable acid may be used.

The process is particularly adapted for the production of boric acid from rasorite, but if desired natural crude borax, known as tincal, or manufactured borax, either in a pure or impure state, or any other suitable manufactured or natural borate may be used without departing from the essential features of the invention.

In this process there is no limitation to any initial concentration of boron oxide ($B_2O_3$) or to any final concentration of boron oxide ($B_2O_3$) in the liquors.

Having thus described my invention, what I claim as new and desire to secure by Letters Patent of the United States, is:—

1. A method of making boric acid, which comprises treating rasorite with sulphuric acid in the proportion of one-half molecule of sulphuric acid to one molecule of the sodium oxide content of rasorite, filtering, and adding to the filtrate sulphuric acid in the proportion of one molecule of the latter to each molecule of sodium oxide present in the borate compound in the filtrate.

2. A method of making boric acid, which comprises treating tincal with sulphuric acid in the proportion of one-half molecule of sulphuric acid to one molecule of the sodium oxide content of tincal, filtering, and adding to the filtrate sulphuric acid in the proportion of one molecule of the latter to each molecule of sodium oxide present in the borate compound in the filtrate.

3. The process of making boric acid which comprises treating a sodium borate free from any substantial amounts of any other metal borates with water and sulphuric acid in amounts to form a concentrated solution of an octoborate, while leaving undesired solid matter undissolved, filtering the solution thus obtained, treating the filtered solution with sulphuric acid to liberate boric acid therefrom by crystallizing same, separating such crystallized boric acid from the mother liquor leaving a spent liquor containing approximately seven percent boric acid, adding such spent mother liquor to a boric acid solution containing approximately 27.62% boric acid and crystallizing boric acid from the latter boric acid liquor.

4. A method of making boric acid which comprises treating a sodium borate, free from any substantial amount of other metal borates, with water and sulphuric acid in amounts to yield a concentrated solution of a sodium borate having a ratio of $B_2O_3$ to $Na_2O$ in excess of 2:1 and a maximum concentration of sodium sulphate below the concentration at which sodium sulphate will deposit from solution, then treating the solution with sulphuric acid and cooling to liberate boric acid therefrom.

5. A method of making boric acid which comprises treating a sodium borate, free from any substantial quantity of other metal borates, with water and sulphuric acid in amounts to yield a concentrated solution of a sodium borate having a ratio of $B_2O_3$ to $Na_2O$ in excess of 2:1, then treating the solution with sulphuric acid to liberate boric acid therefrom and crystallizing the boric acid from the solution.

6. In the manufacture of boric acid from a sodium borate and an acid, the steps which comprises treating a sodium borate, free of any substantial amount of other metal borates, with water and an acid in amounts to yield a concentrated solution of a sodium borate having a ratio of $B_2O_3$ to $Na_2O$ in excess of 2:1 then treating the solution with further acid sufficient to liberate boric acid and crystallizing boric acid therefrom.

7. A method of making boric acid which comprises treating a sodium borate, free from any substantial quantity of other metal borates, with water and sulphuric acid in amounts to yield a concentrated solution of sodium pentaborate, then treating the solution with additional sulphuric acid necessary to form boric acid and cooling the solution to recover the boric acid.

8. A method of making boric acid which comprises treating a sodium borate, free from any substantial quantity of other metal borates, with water and sulphuric acid in amounts to yield a substantially saturated solution of sodium decaborate and octoborate, then treating the solution with additional sulphuric acid necessary to form boric acid and cooling the solution to recover the boric acid.

ALFRED NEWMAN.